(12) United States Patent
Hughes et al.

(10) Patent No.: US 9,458,331 B1
(45) Date of Patent: Oct. 4, 2016

(54) METHOD OF COMBINING ELECTROCOATED PRIMER WITH FLUOROPOLYMER COATING

(71) Applicant: S & J Technologies, LLC, Seminole, OK (US)

(72) Inventors: Dale Lee Hughes, Konawa, OK (US); Charles Andrew Simpson, Mission, TX (US); Samuel Adam Adkisson, Seminole, OK (US); Sammy Lee Adkisson, Seminole, OK (US)

(73) Assignee: S & J TECHNOLOGIES, LLC, Seminole, OK (US)

( * ) Notice: Subject to any disclaimer, the term of this patent is extended or adjusted under 35 U.S.C. 154(b) by 331 days.

(21) Appl. No.: 14/072,526

(22) Filed: Nov. 5, 2013

Related U.S. Application Data

(60) Provisional application No. 61/723,606, filed on Nov. 7, 2012.

(51) Int. Cl.
*C25D 1/12* (2006.01)
*C09D 5/44* (2006.01)

(52) U.S. Cl.
CPC ............. *C09D 5/443* (2013.01); *C09D 5/4473* (2013.01)

(58) Field of Classification Search
CPC .. C09D 5/443; C09D 5/4473; C09D 5/4434; C09D 5/4488; C25D 13/04; C25D 13/06; C25D 13/08; C25D 15/00; B05D 7/57; B05D 5/083; B05D 5/06; B05D 2202/25; B05D 7/52; B05D 7/546; B05D 7/56; B05D 1/007; Y10T 428/12569
See application file for complete search history.

(56) References Cited

U.S. PATENT DOCUMENTS

| | | | |
|---|---|---|---|
| 6,114,040 A * | 9/2000 | Gebregiorgis | C09D 5/443 204/502 |
| 2003/0054193 A1* | 3/2003 | McCollum | B05D 7/52 428/626 |
| 2011/0266157 A1* | 11/2011 | Seradarian | B05D 7/57 205/199 |
| 2012/0211365 A1* | 8/2012 | Joung | C25D 13/18 204/473 |

\* cited by examiner

*Primary Examiner* — Xiuyu Tai
(74) *Attorney, Agent, or Firm* — McAfee & Taft A Professional Corporation

(57) ABSTRACT

The electrophoretically coating of a conductive workpiece with an epoxy resin and then depositing a fluoropolymer top coat on said epoxy resin is provided. The method includes electrodepositing a first epoxy resin layer, which is subsequently at least partially cured, and then depositing a fluoropolymer onto the workpiece as a second layer. Subsequently, the workpiece is further cured.

10 Claims, 3 Drawing Sheets

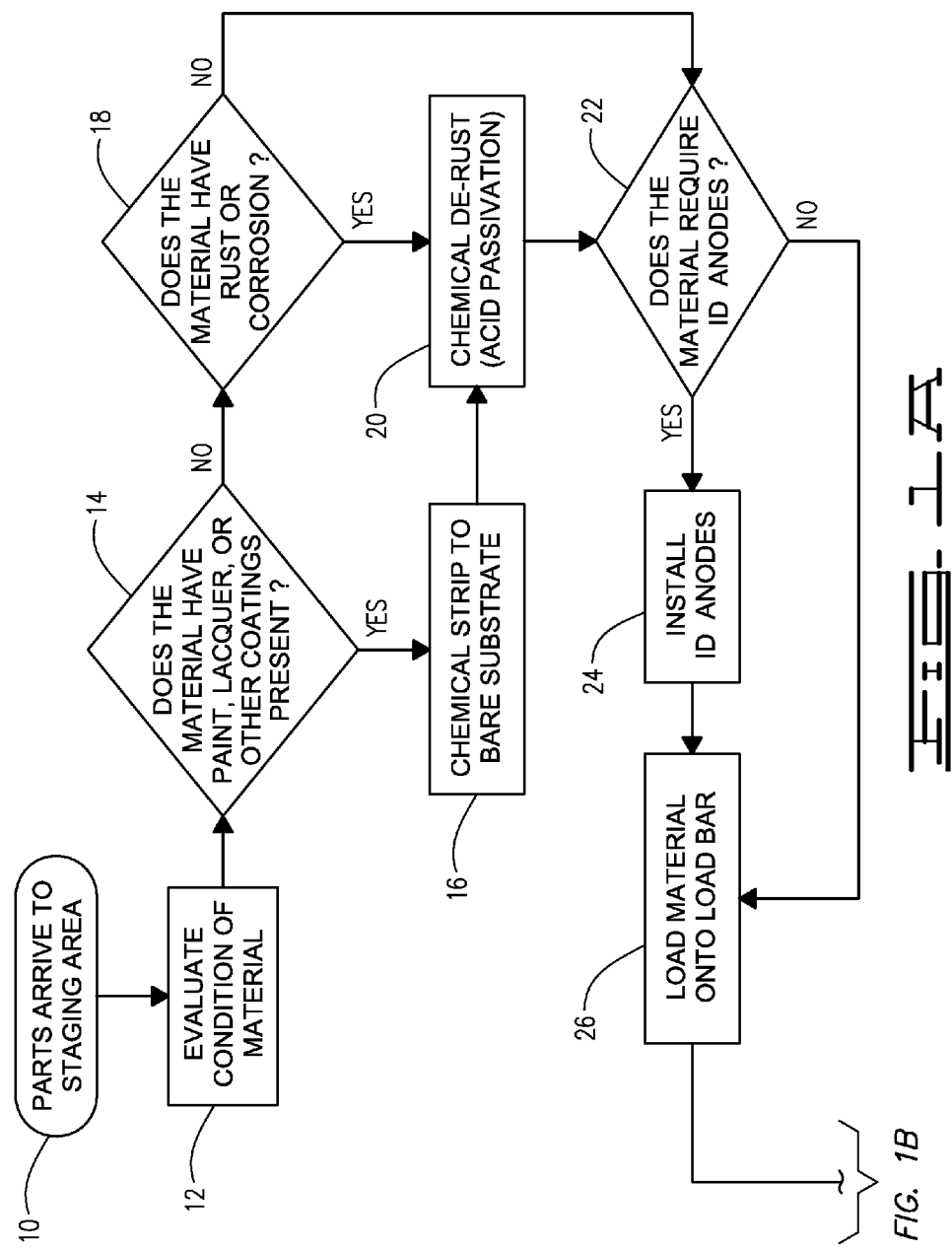

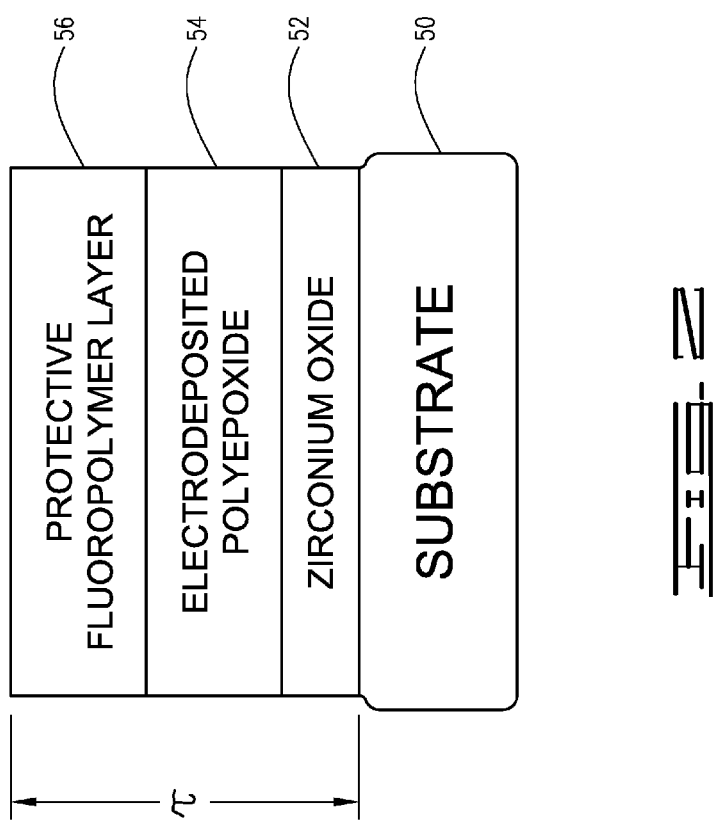

METHOD OF COMBINING ELECTROCOATED PRIMER WITH FLUOROPOLYMER COATING

CROSS REFERENCE TO RELATED APPLICATION

This application claims the benefit of U.S. Provisional Application 61/723,606 filed on Nov. 7, 2012, the disclosure of which is incorporated by reference herein in its entirety.

FIELD OF THE INVENTION

This invention relates generally to electrophoretic deposition of materials on workpieces and more specifically producing articles having a fluoropolymer top coat.

BACKGROUND

Electrophoretic deposition or electrodeposition is predicated upon the phenomenon that charged particles suspended in a liquid medium migrate under the influence of an electric field and are deposited onto an electrode. Electrophoretic deposition of particulate materials to form coatings is currently used in a wide variety of industrial applications, such as in the manufacture of enameled ironware, in applying paint and rubber coatings to metal and plastic articles, in the formation of dielectric coatings on electrical devices, and in other similar industrial processes. Electrophoretic deposition has many advantages over other conventional methods of applying coatings, such as spraying, dipping, brushing and the like, in that the coating is deposited more effectively with regard to the full utilization of the material in the suspension, as there is substantially no waste of particulate materials; and the electrophoretically applied coating is generally more uniform in thickness and density. Accordingly, there is an interest in finding new and useful coatings that can be applied by electrophoretic deposition.

Additionally, in industries such as the oil and gas industry, substantial amounts of equipment are destroyed by corrosion and abrasion. For such industries, there is an interest in coatings that can survive in both chemically and abrasively harsh environments. If such coatings can be applied electrophoretically, then additional benefits as outlined above are also realized.

SUMMARY OF THE INVENTION

In accordance with one embodiment of the invention there is provided a method of coating a conductive workpiece with a fluoropolymer top coat comprising:
(a) positioning the workpiece in a first mixture containing a first epoxy resin, wherein a first electrode is also positioned in the first mixture;
(b) applying a potential between the workpiece and the first electrode until a coating of epoxy resin has been deposited on the workpiece to create an epoxy coated workpiece;
(c) subjecting the epoxy coated workpiece to a first curing sufficient to bring the epoxy resin to at least a partially cross-linked state to create at least a partially cured workpiece;
(d) depositing a second mixture containing a fluoropolymer onto the at least partially cured workpiece to create a fluoropolymer coated workpiece;
(e) subjecting the fluoropolymer coated workpiece to a second curing sufficient to cure the second mixture deposited on the fluoropolymer coated workpiece.

In accordance with another embodiment, there is provided a coated workpiece comprising a conductive workpiece, an undercoating, an epoxy coating and a fluropolymer coating. The workpiece substrate has a surface and the undercoating is adhered to at least a portion of the surface of the workpiece substrate to create an undercoated portion of the surface. The epoxy coating is adhered to the undercoating and the flurorpolymer coating is adhered to the epoxy coating. The coated workpiece has a total dry film thickness from about 2.0 mil to about 3.0 mil and a coefficient of friction of from about 0.15 to about 0.35.

BRIEF DESCRIPTION OF THE DRAWINGS

FIG. 2 is a schematic representation of the topcoats and undercoats on a workpiece in accordance with one embodiment of the current invention.

DESCRIPTION OF THE PREFERRED EMBODIMENTS

Figures 1A, 1B:
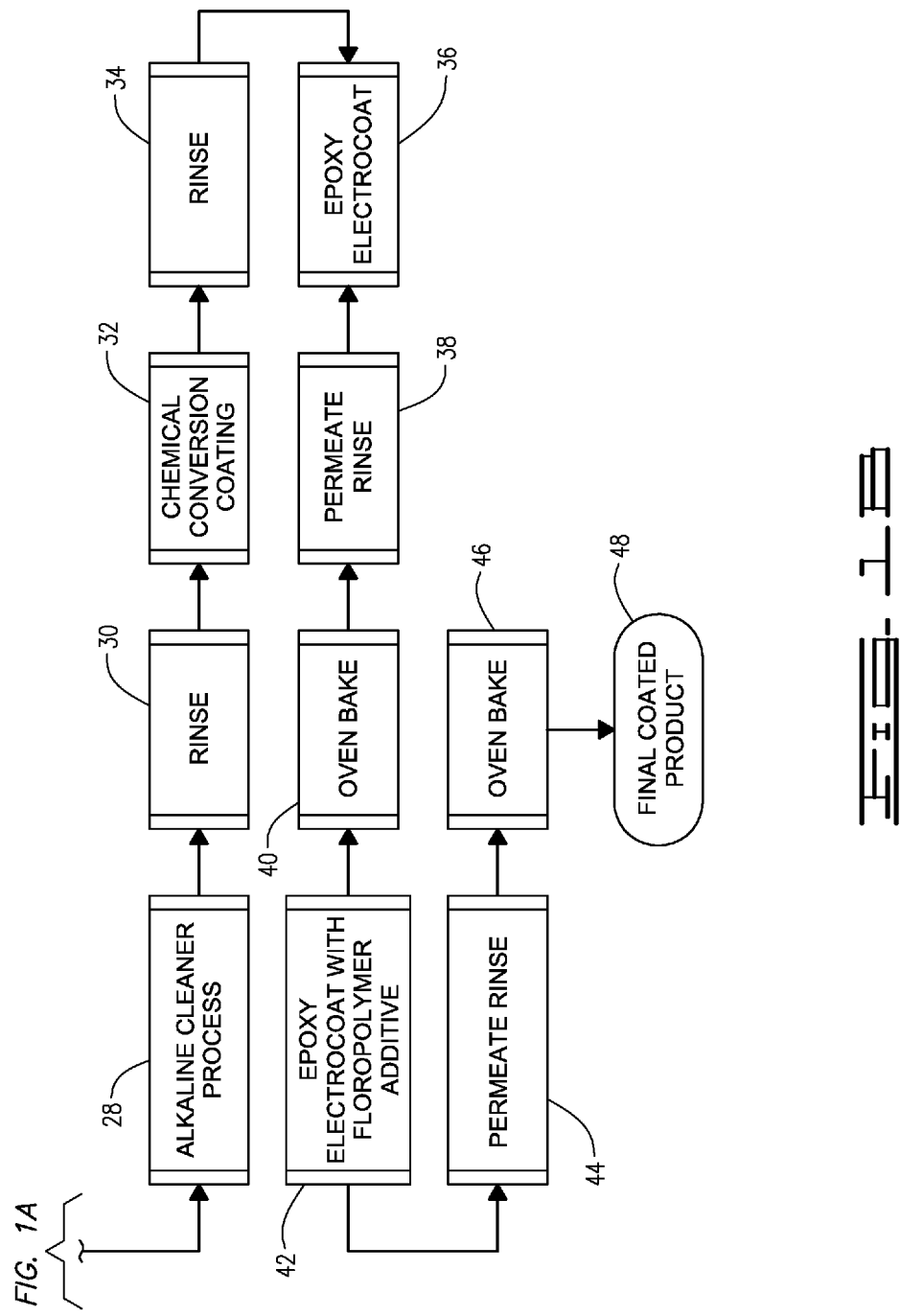
FIGS. 1A and 1B are a diagram illustrating one embodiment of a coating process in accordance with the current invention.

A method in accordance with the current invention will first be described in general and then more specifically with respect to the embodiment illustrated in FIG. 1. In the method according to the current invention, a workpiece to be coated is first cleaned by various methods to remove any oils, grease, oxidation or other contaminants. Next, the workpiece is pretreated to enhance the adhesion of the epoxy coat to the workpiece. Generally, such pretreatment comprises the application of an inorganic phosphate or a metal oxide to the surface of the workpiece.

After cleaning and pretreatment, the workpiece is ready to receive the first coating or epoxy coating. Generally, while the pretreatment can result in a coating of the workpiece, the epoxy coating will be referred to as the first coating and any pretreatment coating will be referred to as an undercoating. Accordingly, the workpiece is positioned in a first mixture containing a first epoxy resin. A first electrode is also positioned in the mixture with the workpiece serving as the opposite charged electrode. After positioning, a potential is applied between the workpiece and the first electrode. The potential is maintained until a suitable coating of epoxy resin has been deposited on the workpiece to create an epoxy coated workpiece. The epoxy coat on the workpiece is, at this point, an epoxy resin coat and is easily wiped or scraped off. The epoxy coated workpiece is subjected to a first curing sufficient to bring the epoxy resin to at least a partially cross-linked state to create an at least partially cured workpiece. Generally, this curing can be a heat curing but can also be other curing techniques know in the art and further described below.

After the epoxy coat is applied and partially cured, the topcoat can be applied to the workpiece. In the application of the topcoat, a second mixture containing a fluoropolymer is deposited onto the partially cured workpiece and, hence, onto the first coating. Generally, the second mixture will contain both a fluoropolymer and an epoxy resin, as further described below. The deposition of the second mixture can be by electrodeposition, similar to the application of the first coating. Alternatively, it is within the scope of the invention for the second mixture to be applied by suitable liquid coating systems, such as spray coating, or by powder coating. Spray coating will generally comprise utilizing a suitable device to spray a coating of the second mixture onto the partially cured workpiece. Typically, a pressurized gas will be used to atomize and direct the second mixture and the second mixture will comprise a solvent along with the fluoropolymer and epoxy resin. In a powder coating process a dry powder is applied to the workpiece. In use in the invention, the dry powder will be a mixture containing the fluoropolymer, and preferably epoxy resin and fluoropolymer. In powder coating, the coating will typically be applied electrostatically.

If electrodeposition is used to apply the topcoat, an electrode is positioned in the second mixture with the workpiece serving as the opposite charged electrode. Next, a potential is applied between the workpiece and the electrode. The potential is maintained until a suitable coating of the fluoropolymer has been deposited on the at least partially cured workpiece. The coating of the fluoropolymer covers the previous at least partially cured coating of epoxy to create a fluoropolymer coated workpiece. At this point the fluoropolymer coat is not bonded to the at least partially cured workpiece. Subsequently, the fluoropolymer workpiece is subjected to a second curing sufficient to cure the coatings on the workpiece; that is, bond the fluoropolymer to the first coating. Accordingly, if the first coating is a partially cured epoxy coating and the second coating, or topcoat, is a fluoropolymer-epoxy mixture, the curing will be sufficient to complete the curing of the first the epoxy resin and to cure the topcoat with at least some cross-linking between the first coating and topcoat. If the first coating is a fully cured epoxy coating and the topcoat is a fluoropolymer-epoxy mixture, the curing will be sufficient to fully cure the topcoat and to bond the topcoat to the first coat.

The method of the current invention will now be described in further detail with regard to the specific embodiment illustrated in FIG. 1, which uses electrodeposition for the topcoat. In the process, the parts or workpieces first arrive and are evaluated for condition, steps 10 and 12. Based on the condition of the workpiece, it will be cleaned by various methods known in the art to remove oils, grease, oxidation or other contaminants. The workpiece will generally be a conductive workpiece; that is, a workpiece made of a conductive material, such as one or more of metals, metal alloys, or graphite. Examples of suitable metals are carbon steel, stainless steel, aluminum, nickel, and copper, which all coat especially well. If the workpiece is made of new material, it may have protective coatings or other treatments that need to be removed. Generally, such coatings or treatments can be removed by the use of an alkaline bath. If the workpiece is made of used material or is an old workpiece then an abrasion cleaning can be used to remove scale, rust and other oxidation. Additionally, an alkaline bath can be used to remove oil, grease or other deposits. Thus, the workpiece can be evaluated for coatings, such as paint, lacquer, protective plastic coating or similar, in step 14. If such coatings exist, the workpiece can be chemically stripped to the bare substrate, step 16, and then chemically treated to remove oxidation, corrosion and/or rust in step 20, if necessary. If no coating exists, the workpiece can be evaluated for oxidation or corrosion in step 18 and then chemically treated in step 20, if needed. Next in steps 22 and 24, the workpiece can have electrodes installed internally (ID anodes or ID cathodes) if needed. Such internal electrodes aid in coating interior surfaces of the workpiece. When ready, the workpiece is placed on a load bar (step 26) to facilitate immersion into various baths as described hereafter. The workpiece can then be immersed in an alkaline cleaner in step 28 to remove any oil, grease or other deposits and to further remove coatings, oxidation and scale. After rinsing in step 30, the now clean workpiece is ready for pretreatment in steps 32 and 34.

The pretreating of the workpiece in steps 32 and 34 comprises treating the workpiece surface to increase the adhesion of the first electrodeposition layer, or epoxy layer. The pretreating can be by any suitable pretreating method. Effective pretreatment can be achieved by application of an inorganic phosphate coating or a metal oxide. Preferred coatings comprise zirconium oxide or zinc phosphate. In one such pretreatment, the workpiece is immersed in an acid based zirconium oxide or zinc phosphate bath for sufficient time to allow the zirconium oxide or zinc phosphate to form a suitable adhesion layer on the workpiece. After adhesion has been suitably achieved, the workpiece is rinsed to remove any extra pretreatment material, solvents and the like.

After pretreatment, the workpiece is electrocoated with a first epoxy resin by electrodeposition in step 36. The electrodeposition process involves submerging the part into a container or vessel, which holds the coating bath, and applying direct current electricity through the bath using electrodes. The coating bath comprises a solution or colloidal suspension of the coating particles in water or another solvent, which may contain additives to facilitate conductivity of the solvent and/or promote the formation of the solution or colloidal suspension. Herein the term solvent is used for both a solvent, when there is a solution of the coating material or particles, and for the dispersion medium, when the coating material or particles are in a colloidal suspension. The coating particles need to be ions or molecules with ionizable groups. The process can be anodic or cathodic. In anodic, a negatively charged coating material is deposited on the positively charged electrode or the anode, i.e. the workpiece. In cathodic, a positively charged coating material is deposited on the negatively charged electrode or the cathode, i.e. the workpiece. For convenience, the process below will be described as a cathodic process but the inventive method is applicable to either anodic or cathodic processes.

In the cathodic process, the workpiece is the negatively charged electrode or cathode. At least one positively charged electrode, or anode, is positioned in the coating bath. More typically, there will be two or more anodes positioned within the bath so as to at least partially surround or totally surround the workpiece. By introducing multiple anodes around the workpiece a more even coating is obtained. When the direct current electricity is applied to the electrodes, the positively charged coating material will migrate by the process of electrophoresis toward the workpiece and be deposited thereon.

The first epoxy resin used in the inventive method has ionizable groups and can form a solution or colloidal suspension with the solvent. Suitable epoxy resins include cationic epoxy resins and can be bisphenol A (BPA) epoxy resins such as those that thermally cross-link to form aromatic urethane linkages; however, resins that cross-link by other mechanisms, such as catalysts, UV light and the like can be used. Generally, if the topcoat is applied by electrodeposition, the epoxy resins can be conductive epoxy resins; that is, the epoxy resin that have additives to increase the conductivity from that of an untreated epoxy resin. Thus, by conductive epoxy resin it is meant that upon curing, the epoxy resin will form a polymer having an increased conductivity from a similar epoxy resin without the conductive additives. One such family of suitable resin is sold under the trade name PowerCron by PPG Industries.

The epoxy resin can be single component or duel component. If the latter, the coating bath can include a curing agent (second component) in solution or colloidal suspension. Preferably the curing agent will have ionizable groups so that it will undergo electrodeposition with the epoxy resin. Curing agents are known in the art and, while any suitable curing agent can be used, presently the preferred curing agents will be heat-activated curing agents. Such heat activated curing agents cure at above room temperature and can be above about 100° F. (about 37° C.) or above about 200° F. (about 93° C.) or above 300° F. (about 148° C.). Additionally, the coating bath can incorporate solid materials such as pigments and fillers that will be deposited with the epoxy resin on the surface of the workpiece. Generally, the epoxy resin coating will be electrodeposited at amperages up to 900 amps and at voltages on the order of 350 volts. More typically, the amperage will be measured based on current density. The term current density is defined herein as the current in amperes per square foot of the surface of the cathode or workpiece. Accordingly, the epoxy resin coating materials can be electrodeposited at a current density of up to 500 amps per square foot and from 50 to 500 volts. Typically, they will be electrodeposited at a current density from 5 to 450 amps per square foot and from 100 to 400 volts and, more typically, from 10 to 400 amps per square foot and from 250 to 350 volts.

After electrodeposition of the first epoxy resin, the workpiece will undergo a rinse to remove solvent and excess material and the workpiece will have an epoxy resin coat on it to thus form an epoxy coated workpiece. The epoxy coated workpiece will then undergo curing in step 40. The curing will be at least sufficient to partially cure the epoxy resin, that is to at least partially cross-link the epoxy resin molecules; however, it can be a complete cure or full cure of the epoxy resin; that is, a substantially complete cross-linking of the epoxy resin molecules. Generally, curing can occur through the action of heat, catalysts, UV light and the like. In the process illustrated in FIG. 1, the curing is through an oven bake and, thus, is heat curing. If heat curing is used, partial curing of the epoxy resin can be carried out by curing at a lower temperature for the curing time recommend for a higher temperature, where the lower temperature is slightly less than the higher temperature, typically from about 10° to about 50° F. (about 5° to about 28° C.) and more typically from about 15° to about 30° F. (about 9° to about 16° C.) less than the higher temperature. Accordingly, if the epoxy resin cures at 325° F. for 20 minutes then partial curing can be carried out at 300° F. for 20 minutes. It should be understood that the actual times and curing temperatures will depend on the epoxy resin and curing agent chosen.

After at least partially curing the first coating on the workpiece, the resulting at least partially cured workpiece has the fluoropolymer deposited on it. In the embodiment illustrated in FIG. 1, the deposition is by electrocoating the workpiece with a mixture containing a fluoropolymer as indicated in step 42. While the same non-workpiece electrode can be utilized in the coating bath for step 42, more typically separate electrodes will be utilized. Generally, the coating bath will comprise a mixture of fluoropolymer and a second epoxy resin in solution or colloidal suspension with a solvent. The fluoropolymer and second epoxy resin used in the inventive method have ionizable groups and can form a solution or colloidal suspension with the solvent. Additionally, if heat curing is used, the fluoropolymer should generally be chosen so that the curing temperature required to bond the fluoropolymer with the first and second epoxy resins is higher than the curing temperature of either the first or second epoxy resin but is lower than the decomposition temperature of the first epoxy resin, second epoxy resin and any curing agent.

The suitable epoxy resins for the fluoropolymer-containing mixture include cationic epoxy resins and can be BPA epoxy resins such as those that thermally cross-link to form aromatic urethane linkages; however, resins that cross-link by other mechanisms, such as catalyst, UV light and the like can be used. One such family of suitable resin is sold under the trade name PowerCron by PPG Industries. Additionally, the mixture will contain a suitable fluoropolymer and can contain polyethylene additives. Suitable fluoropolymers include ones sold under the trade name Teflon by E. I. du Pont de Nemours and Company.

The second epoxy resin can be single component or duel component. If the latter, the mixture or coating bath can include a curing agent in solution or colloidal suspension. Preferably the curing agent will have ionizable groups so that it will undergo electrodeposition with the epoxy resin. Curing agents are known in the art and, while any suitable curing agent can be used, presently the preferred curing agents will be heat-activated curing agents. Such heat activated curing agents cure at above room temperature and can be above about 100° F. (about 37° C.) or above about 200° F. (about 93° C.), or at above about 300° F. (about 148° C.). Additionally, the coating bath may incorporate solid materials such as pigments and fillers that will be deposited with the epoxy resin on the surface of the workpiece.

Generally, the second coating bath will be carried out at electrodeposite amperages up to 900 amps and at voltages on the order of 350 volts. More typically, the amperage will be measured based on current density. The term current density is defined herein as the current in amperes per square foot of the surface of the cathode or workpiece. Accordingly, the second electrodeposition bath can be carried out at a current density of up to 500 amps per square foot and from 50 to 500 volts. Typically, the electrodeposition can be at a current density from 5 to 450 amps per square foot and from 100 to 400 volts and, more typically, from 10 to 400 amps per square foot and from 250 to 350 volts.

After electrodeposition of the fluoropolymer, the now fluoropolymer coated workpiece is rinsed (step 44) and subjected to a second curing (step 46). The second curing should be sufficient to substantially completely cure the first epoxy resin, if it was only partially cured, and to substantially completely cure the second epoxy resin/fluoropolymer coat on the fluoropolymer coated workpiece. Thus, the fluoropolymer will be bonded with the first electrodeposition layer or first epoxy coating (resulting from the first epoxy resin) and the second epoxy, which along with the fluoropolymer, forms a part of the topcoat. As illustrated in the embodiment of FIG. 1, the second curing is by heat curing at a second curing temperature; however, other curing methods can be used. The resulting finished workpiece has the structure indicated in FIG. 2, wherein the workpiece or substrate 50 is covered by an undercoat or adhesion layer 52 (illustrated as zirconium oxide) which in turn is covered by and bonded to a first coat 54, which is an electrodeposited polyepoxide or epoxy layer. The first coat 54 is covered by and bonded to topcoat 56, which is an electrodeposited fluoropolymer layer 56 and, generally, an epoxy-fluoropolymer layer. The dry film thickness τ (total thickness of the three layers) can generally be from about 2.0 mils to about 2.8 mils (about 0.05 millimeters to about 0.07 millimeters) but can be from about 2.0 mils to about 3.0 mils (about 0.05 millimeters to about 0.08 millimeters). The resulting finished workpiece has a low coefficient of friction, generally about 0.15 to about 0.35; excellent adhesion, approximately Grade 5B in accordance with ASTM 3359; extreme abrasion resistance, less than 0.012 gram loss per cycle at 2000 cycles; and low permeability to substrate, evidencing good chemical resistance.

Specific embodiments include a method of coating a conductive workpiece with a fluoropolymer top coat comprising:
(a) positioning the workpiece in a first mixture containing a first epoxy resin, wherein a first electrode is also positioned in the first mixture;
(b) applying a potential between the workpiece and the first electrode until a coating of epoxy resin has been deposited on the workpiece to create an epoxy coated workpiece;
(c) subjecting the epoxy coated workpiece to a first curing sufficient to bring the epoxy resin to at least a partially cross-linked state to create at least a partially cured workpiece;
(d) depositing a second mixture containing a fluoropolymer onto the at least partially cured workpiece to create a fluoropolymer coated workpiece;
(e) subjecting the fluoropolymer coated workpiece to a second curing sufficient to cure the second mixture deposited on the fluoropolymer coated workpiece.

Further, the first curing in the method can fully cure the epoxy resin or the first curing can partially cure the epoxy resin such that the epoxy resin is in a partially cross-linked state. Also, the second mixture can be deposited by a process selected from the group comprising electrodeposition, spray coating and powder coating. In one embodiment the second mixture is deposited by the steps comprising:
(i) positioning the at least partially cured workpiece in the second mixture, wherein a second electrode is also positioned in the second mixture; and
(ii) applying a potential between the at least partially cured workpiece and the second electrode until a coating of the fluoropolymer has been deposited on the workpiece to create the fluoropolymer coated workpiece.

In a further embodiment the first mixture and second mixture used in the method can be colloids. In another embodiment the first curing occurs at a first temperature and the second curing occurs at a second temperature. The first temperature is less than the second temperature and the second temperature is less than the decomposition temperature of the first epoxy resin. Additionally, the second mixture can contain the fluoropolymer and a second epoxy resin and then the second temperature can be less than the decomposition temperature of the first epoxy resin and the decomposition temperature of the second epoxy resin. Also, the first epoxy resin is a conductive resin and the second epoxy resin is a nonconductive resin.

In accordance with another embodiment, there is provided a coated workpiece comprising a conductive workpiece, an undercoating, an epoxy coating and a fluropolymer coating. The workpiece substrate has a surface and the undercoating is adhered to at least a portion of the surface of the workpiece substrate to create an undercoated portion of the surface. The epoxy coating is adhered to the undercoating and the fluropolymer coating is adhered to the epoxy coating. The coated workpiece has a total dry film thickness from about 2.0 mils to about 3.0 mils and a coefficient of friction of from about 0.15 to about 0.35.

In a further embodiment of the coated workpiece, the epoxy coating is adhered to the undercoating by applying an epoxy resin to the undercoated portion of the surface by electrodeposition and, subsequently, at least partially curing the epoxy resin to produce an epoxy coated portion of the surface. Also, the fluropolymer can be adhered to the epoxy coating by applying a mixture containing fluropolymer and epoxy resin to the epoxy coated portion of the surface and, subsequently, curing the mixture. Additionally, the mixture can be applied by electrodeposition.

It will be seen that the method of the current invention is well adapted to carry out the ends and advantages mentioned as well as those inherent therein. While the presently preferred embodiment of the invention has been shown for the purposes of this disclosure, numerous changes in the arrangement and construction of parts may be made by those skilled in the art. All such changes are encompassed within the scope and spirit of the dependent claims.

What is claimed is:

1. A method of coating a conductive workpiece with a fluoropolymer topcoat comprising:
(a) positioning said workpiece in a first mixture containing a first epoxy resin, wherein a first electrode is also positioned in said first mixture;
(b) applying a potential between said workpiece and said first electrode until a coating of said first epoxy resin has been deposited on said workpiece to create an epoxy-coated workpiece;
(c) subjecting said first epoxy-coated workpiece to a first curing sufficient to bring said first epoxy resin to at least a partially cross-linked state to create at least a partially cured workpiece;
(d) depositing a second mixture containing a fluoropolymer onto said at least partially cured workpiece to create a fluoropolymer coated workpiece, wherein said second mixture is deposited by electrodeposition; and
(e) subjecting said fluoropolymer-coated workpiece to a second curing sufficient to cure said second mixture deposited on said epoxy-coated workpiece.

2. The method of claim 1 wherein said first curing fully cures said first epoxy resin.

3. The method of claim 1 wherein said first curing partially cures said first epoxy resin such that said first epoxy resin is in a partially cross-linked state.

4. The method of claim 1 wherein said depositing step (d) further comprises:
(i) positioning said at least partially cured workpiece in said second mixture, wherein a second electrode is also positioned in said second mixture; and
(ii) applying a potential between said at least partially cured workpiece and said second electrode until a coating of said fluoropolymer has been deposited on said workpiece to create said fluoropolymer-coated workpiece.

5. The method of claim 4 wherein said first mixture and second mixture are colloids.

6. The method of claim 4 wherein said first epoxy resin has a first-epoxy curing temperature and a first-epoxy decomposition temperature, and wherein said first curing occurs at a first temperature, which is greater than said first-epoxy curing temperature, and said second curing occurs at a second temperature and wherein said first-epoxy curing temperature is less than said second temperature and said second temperature is less than said first-epoxy decomposition temperature.

7. The method of claim 6 wherein said second mixture contains said fluoropolymer and a second epoxy resin.

8. The method of claim 7 wherein said second epoxy resin has a second-epoxy curing temperature and a second-epoxy decomposition temperature, and wherein said second temperature is greater than said second epoxy curing temperature and is less than said second-epoxy decomposition temperature.

9. The method of claim 7 wherein said first epoxy resin is a conductive resin and said second epoxy resin is a nonconductive resin.

10. The method of claim 1 wherein said second mixture contains said fluoropolymer and a second epoxy resin and after said step (e) of subjecting said fluoropolymer workpiece to said second curing, said work workpiece has an epoxy layer covered by and bonded to an epoxy-fluoropolymer layer.

* * * * *